US012673383B2

(12) United States Patent　　(10) Patent No.:　US 12,673,383 B2
Oribe et al.　　(45) Date of Patent:　　Jul. 7, 2026

(54) LASER PROCESSING MACHINE AND LASER PROCESSING METHOD

(71) Applicant: AMADA CO., LTD., Kanagawa (JP)

(72) Inventors: Yoshiyuki Oribe, Kanagawa (JP); Junichi Saito, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 1130 days.

(21) Appl. No.: 17/615,711

(22) PCT Filed: Jun. 3, 2020

(86) PCT No.: PCT/JP2020/021862
§ 371 (c)(1),
(2) Date: Dec. 1, 2021

(87) PCT Pub. No.: WO2020/246490
PCT Pub. Date: Dec. 10, 2020

(65) Prior Publication Data
US 2022/0241894 A1　　Aug. 4, 2022

(30) Foreign Application Priority Data
Jun. 6, 2019　(JP) ................................. 2019-106118

(51) Int. Cl.
B23K 26/064　　(2014.01)
B23K 26/046　　(2014.01)
(52) U.S. Cl.
CPC ........ B23K 26/0648 (2013.01); B23K 26/046 (2013.01)

(58) Field of Classification Search
CPC .............. B23K 26/046; B23K 26/0648; B23K 26/0665; B23K 26/38; B23K 26/0652;
(Continued)

(56) References Cited

U.S. PATENT DOCUMENTS 9,482,821 B2　11/2016　Huber
2013/0148925 A1　6/2013　Muendel
(Continued)

FOREIGN PATENT DOCUMENTS

JP　　04231190 A　8/1992
JP　　2009226473 A　* 10/2009
(Continued)

OTHER PUBLICATIONS

Extended European Search Report for corresponding EP Application No. 20818070.3 issued Jul. 1, 2022.
(Continued)

*Primary Examiner* — Vy T Nguyen
(74) *Attorney, Agent, or Firm* — Renner, Otto, Boisselle & Sklar, LLP

(57)　　　　ABSTRACT
A laser processing machine includes a coupler that is an optical device capable of changing a beam profile of a laser beam emitted from a fiber laser oscillator, a focusing lens configured to focus the laser beam emitted from the coupler, the focusing lens including a first lens region with a first focal length on an inner peripheral side thereof and a second lens region with a second focal length on an outer peripheral side thereof, the second focal length being different from the first focal length, and a moving mechanism configured to move the focusing lens in an optical axis direction.

5 Claims, 7 Drawing Sheets

(58) Field of Classification Search
CPC ............ B23K 26/0734; B23K 2103/04; B23K
26/21; B23K 26/24; B23K 26/382; B23K
26/40; B23K 2101/18; B23K 26/032;
B23K 26/035; B23K 26/04; B23K
26/073; B23K 26/0732; B23K 26/082;
B23K 26/0876; B23K 26/355; B23K
26/359; B23K 26/702; B23K 26/705;
B23K 31/125; B23K 37/0235; B23K
37/0408; G02B 27/0927; G02B 3/08;
G02B 5/001
USPC ............ 219/121.72, 121.61, 121.67, 121.68,
219/121.7, 121.71, 121.73, 121.6, 121.69,
219/121.75, 121.77, 121.78, 121.83,
219/121.74, 121.76, 121.63, 121.64,
219/121.8, 121.85, 61, 62, 67, 71, 73;
359/618, 16, 204.1, 209.1, 238, 554, 637,
359/19, 196.1, 197.1, 205.1, 212.1, 233,
359/240, 301, 334, 341.1, 350, 362, 380,
359/393, 398, 566, 569, 720, 823, 839;
385/18, 88, 109, 122, 127, 147, 16, 49,
385/53

See application file for complete search history.

(56) References Cited

U.S. PATENT DOCUMENTS

| | | | |
|---|---|---|---|
| 2014/0131327 A1 | 5/2014 | Nishitani | |
| 2016/0116679 A1 | 4/2016 | Muendel | |
| 2018/0214980 A1 | 8/2018 | Gross et al. | |
| 2021/0003445 A1* | 1/2021 | Blázquez-Sánchez | ..................... B23K 26/707 |

FOREIGN PATENT DOCUMENTS

| | | | | |
|---|---|---|---|---|
| JP | 2013169559 A | * | 9/2013 | |
| JP | 2015-500571 A | | 1/2015 | |
| JP | 5832412 B2 | | 12/2015 | |
| JP | 2019018233 A | | 2/2019 | |
| KR | 20060090130 A | * | 8/2006 | |
| WO | 2018/217284 A1 | | 11/2018 | |

OTHER PUBLICATIONS

International Search Report for corresponding Application No.
PCT/JP2020/021862, mailed Aug. 18, 2020.
Written Opinion for corresponding Application No. PCT/JP2020/
021862, mailed Aug. 18, 2020.

* cited by examiner

LASER PROCESSING MACHINE AND LASER PROCESSING METHOD

TECHNICAL FIELD

The present disclosure relates to a laser processing machine and a laser processing method for welding a sheet metal with a laser beam.

BACKGROUND ART

A laser processing machine for welding a sheet metal with a laser beam emitted from a laser oscillator is widely used. A fiber laser oscillator is often used as the laser oscillator.

In the laser processing machine, it is necessary to properly set a beam profile of the laser beam to be emitted to the sheet metal according to a welding condition of the sheet metal, for example, a size of a gap between the sheet metals to be welded. Patent Literature 1 describes a laser processing machine capable of processing a sheet metal by selecting any beam profile from among a plurality of beam profiles. This laser processing machine changes the beam profile by changing an incident angle of the laser beam made incident on a process fiber.

CITATION LIST

Patent Literature

Patent Literature 1: Japanese Translation of PCT International Application Publication No. 2015-500571
Patent Literature 2: U.S. Pat. No. 9,482,821 (B2)
Patent Literature 3: Japanese Patent No. 5832412
Patent Literature 4: International Publication No. WO 2018/217284

SUMMARY

In a welding process of the sheet metals, when there is a gap between the target sheet metals, a ring-shaped laser beam having a relatively large beam diameter and a high energy intensity may be emitted to melt the sheet metals on both sides of the gap (hereinafter referred to as a gap welding). However, the laser beam emitted by the above laser processing machine described in Patent Literature 1 has a relatively small beam diameter. As a result, the laser beam may not be emitted to the both sides of the gap between the objects to be processed. Further, in order to increase the beam diameter, a focusing position (focus position) may be shifted from a top surface of the sheet so as to move the position of the sheet metal away from the laser processing machine for making the beam diameter larger. In other words, so-called defocus may be performed. However, this may make the intensity of the laser beam low at the position to be processed, thereby a good gap welding cannot be performed.

An object of the present disclosure is to provide a laser processing machine and a laser processing method capable of changing a beam profile of a laser beam according to a processing condition so as to be focused on a sheet metal to be processed.

According to a first aspect of one or more embodiments, there is provided a laser processing machine including an optical device capable of changing a beam profile of a laser beam emitted from a fiber laser oscillator, a focusing lens configured to focus the laser beam emitted from the optical device, the focusing lens including a first lens region with a first focal length on an inner peripheral side thereof and a second lens region with a second focal length on an outer peripheral side thereof, the second focal length being longer than the first focal length, and a moving mechanism configured to move the focusing lens in an optical axis direction.

According to a second aspect of the one or more embodiments, there is provided a laser processing method including moving, by the moving mechanism, the focusing lens in the optical axis direction so that a length between the focusing lens and an object to be processed is between the first focal length and the second focal length when a laser beam is made incident on the first lens region and the second lens region of the focusing lens by the optical device of the above laser processing machine.

According a third aspect of the one or more embodiments, there is provided a laser processing method including moving, by the moving mechanism, the focusing lens in the optical axis direction so that a length between the focusing lens and an object to be processed is the second focal length when a ring-shaped laser beam is made incident on the second lens region of the focusing lens by the optical device of the above laser processing machine.

According to the laser processing machine and the laser processing method of the one or more embodiments, welding corresponding to various processing conditions is made possible by changing the beam profile of the laser beam according to the processing condition so as to be focused on the sheet metal to be processed.

BRIEF DESCRIPTION OF DRAWINGS

FIG. 2 is a schematic view showing a configuration of a focusing lens used in the laser processing machine of the first embodiment.

FIG. 4 is an overall view showing a configuration of a laser processing machine of a second embodiment.

DESCRIPTION OF EMBODIMENTS

Figure 1:
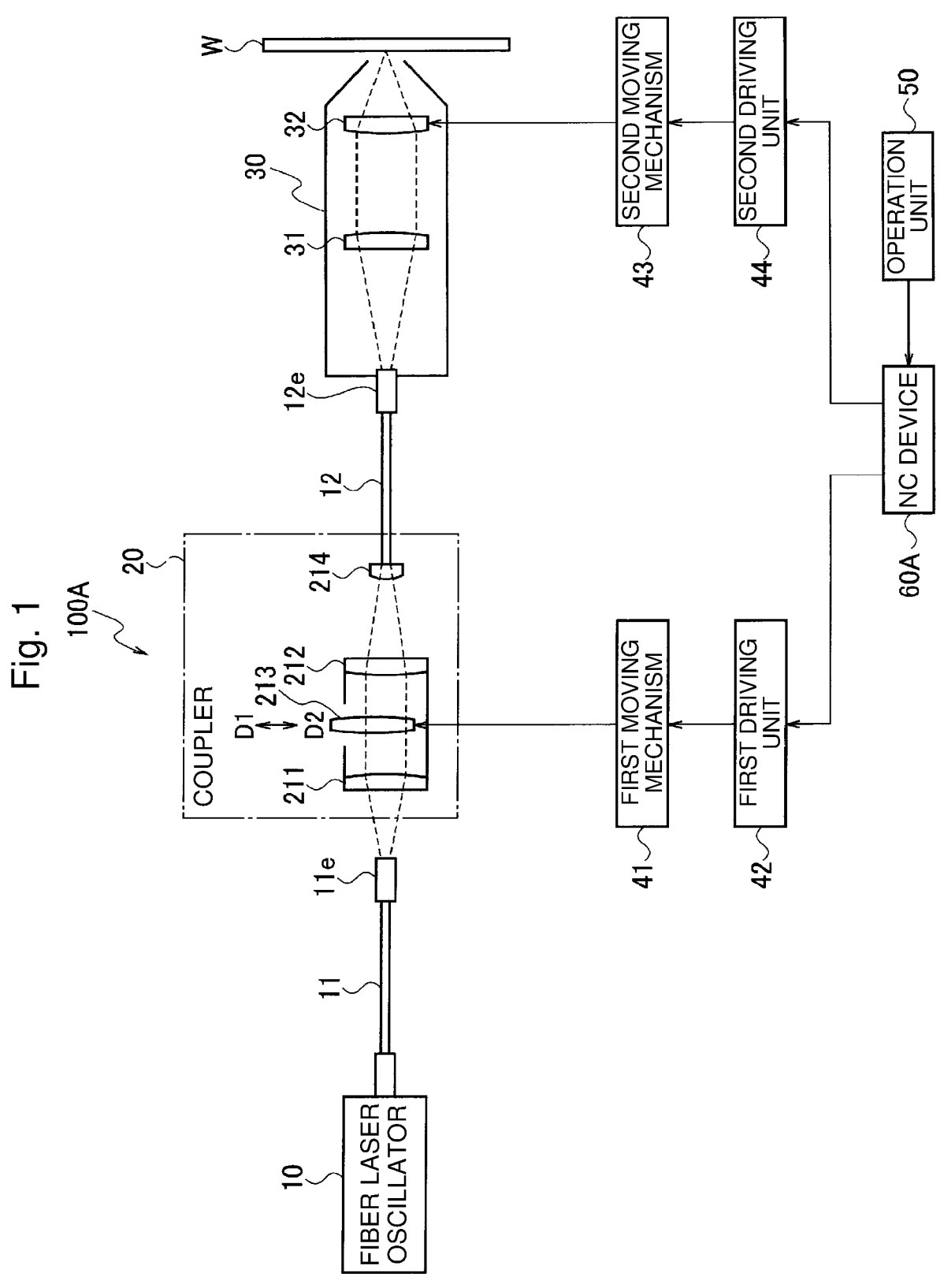
FIG. 1 is an overall view showing a configuration of a laser processing machine of a first embodiment.

Hereinafter, the laser processing machines of the first to fourth embodiments will be described with reference to the attached drawings. In the laser processing machines of the first to fourth embodiments, the same reference numerals are given to the portions having the same functions, and the descriptions thereof may be omitted.

First Embodiment

Hereinafter, the laser processing machine of the first embodiment will be described with reference to the attached drawings. In FIG. 1, a laser processing machine 100A includes a fiber laser oscillator 10 configured to generate and emit a laser beam, a coupler 20 that is an optical device configured to change a beam profile of the laser beam emitted from the fiber laser oscillator 10, and a processing head 30 configured to cause the laser beam whose beam profile has been changed by the coupler 20 to focus on a sheet metal W to be processed. The laser beam emitted from the fiber laser oscillator 10 is transmitted to the coupler 20 by a feeding fiber 11, and the laser beam whose beam profile has been changed by the coupler 20 is transmitted to the processing head 30 by the process fiber 12.

The fiber laser oscillator 10 emits a laser beam having, for example, a wavelength of 1060 nm to 1080 nm with a laser output of 2 kW.

The coupler 20 is installed at a position of a predetermined length in an optical axis direction from an end cap 11e provided at an emission end of the laser beam of the feeding fiber 11. The coupler 20 includes a first collimator lens 211, a first focusing lens 212, a movable lens 213, and a fiber incident lens 214. The movable lens 213 is a so-called biconvex lens. The movable lens 213 is arranged between the first collimator lens 211 and the first focusing lens 212 in a state of being movable in a plurality of stages in a D1 direction or a D2 direction perpendicular to the optical axis. The fiber incident lens 214 is connected to the process fiber 12 and installed at a position of a predetermined length in the optical axis direction from the first focusing lens 212.

The first collimator lens 211 receives a laser beam of a divergent beam emitted from the end cap 11e and converts the laser beam into a collimated beam (parallel beam). The movable lens 213 changes a spreading angle of the laser beam, which has been converted into the collimated beam by the first collimator lens 211, according to its position. The first focusing lens 212 focuses the laser beam, whose spreading angle has been changed by the movable lens 213, on the fiber incident lens 214. The fiber incident lens 214 causes the laser beam, which has been focused by the first focusing lens 212, to enter the process fiber 12 at an angle corresponding to the spreading angle. With this configuration, a laser beam having a beam profile corresponding to the spreading angle is made incident from the coupler 20 on the process fiber 12.

Now, the change of the beam profile will be described in detail.

The change of the beam profile can be made by changing a BPP (beam parameter product) with an optical device. As defined in ISO 11145, the BPP represents the relationship among an incident beam diameter, a beam condensing diameter, and a divergent angle (spreading angle) for a focusing lens. The BPP also represents the relationship with a Rayleigh length. Further, in the present invention, an irradiation diameter when the sheet metal W is irradiated is referred to simply as a beam diameter so as to distinguish the beam diameter from the incident beam diameter and the beam condensing diameter for the focusing lens.

When the beam profile change optical device is not operated and the BPP is not changed, the beam condensing diameter and the Rayleigh length are determined according to the incident beam diameter. When the optical device is operated to change the BPP, the beam condensing diameter and the Rayleigh length are changed, which further changes the beam diameter according to the length between the focusing lens and the sheet metal W. In other words, changing a beam parameter product can change the spreading angle and the beam diameter.

When the beam profile change optical device is operated and the incident beam diameter for the focusing lens becomes larger, the beam condensing diameter and the Rayleigh length become smaller. The beam profile is changed to a Gaussian shape, having a high power density in its center portion. As the incident beam diameter becomes smaller, the beam condensing diameter and the Rayleigh length become larger. The beam profile is changed to a ring shape, having a higher power density in its periphery than in its center portion.

The process fiber 12 propagates the laser beam made incident from the fiber incident lens 214, and emits the laser beam from an end cap 12e provided at an emission end thereof.

The processing head 30 includes a second collimator lens 31 and a second focusing lens 32. The second collimator lens 31 is installed at a position of a predetermined length in the optical axis direction from the end cap 12e. The second collimator lens 31 receives the laser beam emitted from the end cap 12e and converts the laser beam into a collimated beam.

Figure 2:
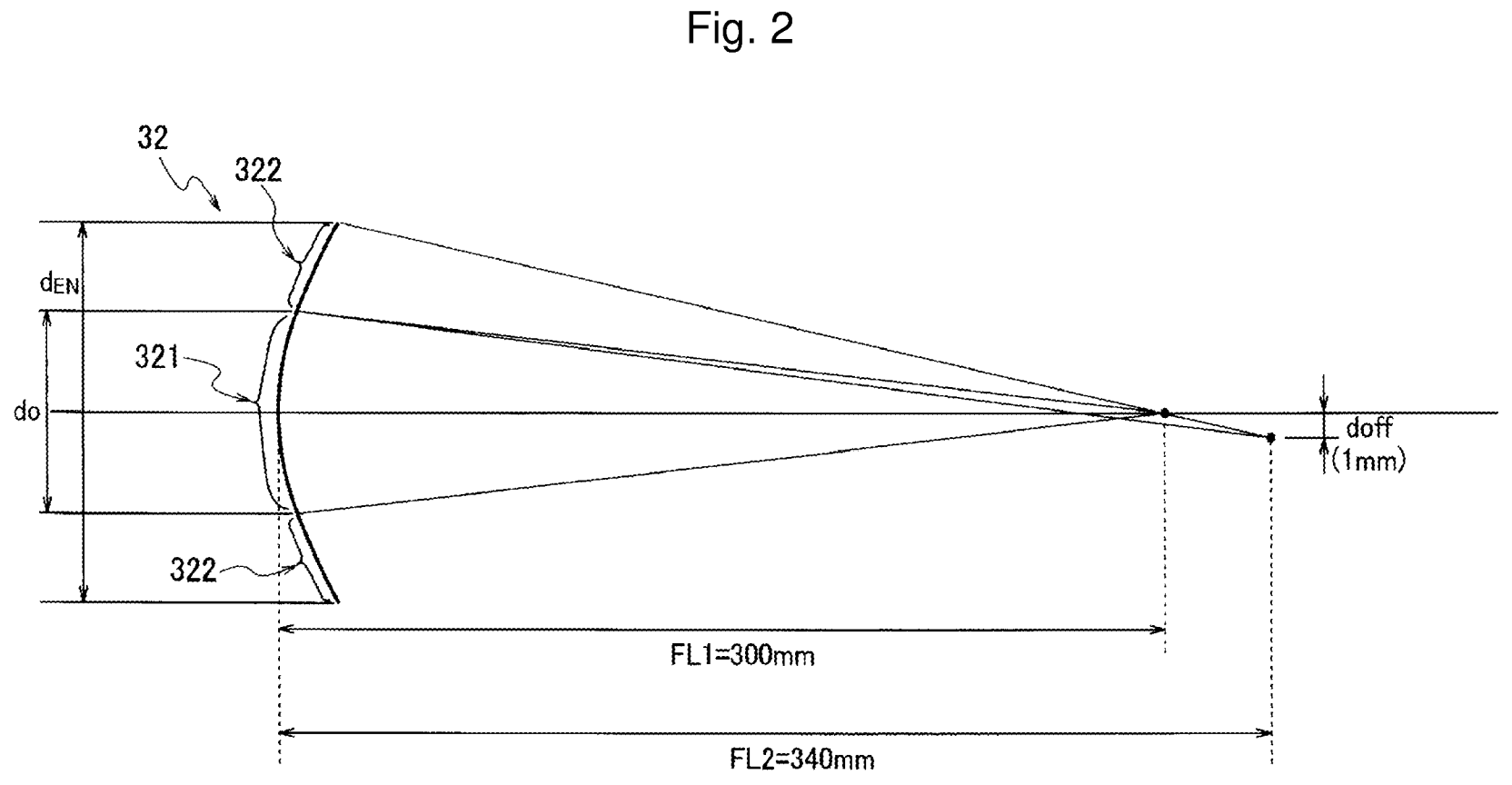

The second focusing lens 32 is installed in a state of being movable in the optical axis direction. The second focusing lens 32 focuses the laser beam, which has been converted into the collimated beam by the second collimator lens 31, to irradiate the sheet metal W to be processed. The detailed configuration of the second focusing lens 32 will be described with reference to FIG. 2. FIG. 2 is a diagram showing the second focusing lens 32 and focusing positions by the second focusing lens 32. The second focusing lens 32 includes a first lens region 321 located on an inner peripheral side and a second lens region 322 located on an outer peripheral side of the first lens region 321 to focus the incident collimated beam. The first lens region 321 has a positive first focal length FL1 (for example, FL1=300 mm), and the second lens region 322 has a positive second focal length FL2 (for example, FL2=340 mm) that is longer than the first focal length FL. The first lens region 321 is configured with a spherical lens, and the second lens region 322 is configured with an aspherical lens. In FIG. 2, for simplification of the description, only the focusing position of a region above the first lens region 321 of the second lens region 322 is shown.

In other words, the second focusing lens 32 includes the first lens region 321 having a focal length of FL1 and the second lens region 322 having a focal length of FL2. Further, the focusing position of the first lens region 321 is on the laser optical axis, whereas the focusing position of the second lens region 322 is not on the laser optical axis. This means that the laser beam focused in the second lens region 322 is focused with a ring-shaped profile at a position deviated from the optical axis, which is different from the focusing position of the laser beam focused in the first lens region 321.

Returning to FIG. 1, the laser processing machine 100A includes a first moving mechanism 41 for moving the movable lens 213 in the coupler 20 in the D1 direction or the D2 direction, and a first driving unit 42 for driving the first moving mechanism 41. Further, the laser processing machine 100A includes a second moving mechanism 43 for moving the second focusing lens 32 in the optical axis direction, and a second driving unit 44 for driving the second moving mechanism 43. Furthermore, the laser processing machine 100A includes an operation unit 50 for an operator to perform an operation of setting a processing condition. The laser processing machine 100A includes an NC device 60A for controlling an operation of the first moving mechanism 41 by the first driving unit 42 and an operation of the second moving mechanism 43 by the second driving unit 44. The NC device 60A is an example of a control device.

The NC device 60A controls the first driving unit 42 so as to change the beam profile of the laser beam emitted from the coupler 20 on the basis of a content set by the operation unit 50, and also controls the second driving unit 44 so as to match the focusing position of the changed laser beam to the sheet metal W to be processed.

In other words, the NC device 60A controls the first driving unit 42 and the second driving unit 44 by using the relationship between the first focusing position at which the incident beam is focused into a Gaussian shape in the first lens region 321 and the second focusing position at which the incident beam is focused into a ring shape in the second lens region 322 (position different from the focusing position of the first lens region 321). This makes it possible for the NC device 60A to freely change the beam profile, for example, from the Gaussian shape to a composite shape of the ring shape and the Gaussian shape formed between the first focusing position and the second focusing position, or to the shape.

Figure 3A:
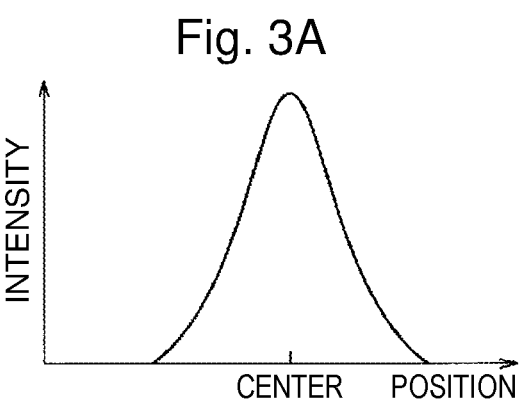
FIG. 3A is a diagram showing an example of an energy intensity at each position of a laser beam emitted by the laser processing machine of the first to fourth embodiments.

When the laser processing machine 100A configured as described above is used to perform a deep penetration process at high speed for welding a thick plate, the operator performs an operation in the operation unit 50 to instruct that a Gaussian shape is used as the beam profile of the laser beam to be emitted. The Gaussian shape is a beam profile as shown in FIG. 3A, in which the beam diameter is small and the intensity sharply increases from the peripheral portion to the center portion. Information of the operation is transmitted to the NC device 60A.

When the NC device 60A receives the instruction from the operation unit 50 that the Gaussian shape is used as the beam profile of the laser beam to be emitted, the NC device 60A controls the first driving unit 42 so that the movable lens 213 in the coupler 20 is moved by the first moving mechanism 41 in the D1 direction (for example, to the end portion in the D1 direction). When the movable lens 213 is moved in the D1 direction, the laser beam to be made incident does not pass through the movable lens 213. Therefore, a Gaussian-shaped laser beam having a smaller incident beam diameter is made incident on the second collimator lens 31 of the processing head 30 via the process fiber 12. Since the laser beam has a small incident beam diameter, for example, d0 or less in FIG. 2, the laser beam is made incident on the first lens region 321 of the second focusing lens 32.

Here, since the first lens region 321 has the first focal length FL1, the NC device 60A controls the second driving unit 44 so that the length between the second focusing lens 32 and the top surface of the sheet metal W is arranged to be separated by the first focal length FL1. By controlling in this manner, the Gaussian-shaped laser beam having a small beam diameter is focused on the sheet metal W. At this time, the sheet metal W is irradiated with a beam having an energy amount of at least 86% of the laser beam emitted from the fiber laser oscillator 10, which allows a deep penetration process at high speed to be suitably executed.

Figure 3B:
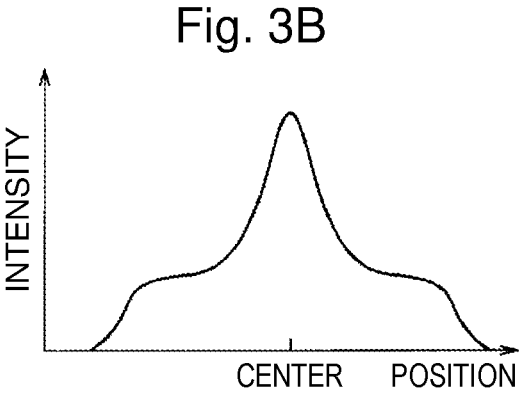
FIG. 3B is a diagram showing an example of an energy intensity at each position of a laser beam emitted by the laser processing machine of the first to fourth embodiments.

Further, when the laser processing machine 100A is used to weld a surface treated steel sheet or an aluminum, the operator performs an operation in the operation unit 50 to instruct that a two-stage intensity type is used as the beam profile of the laser beam to be emitted. The two-stage intensity type is a beam profile having the characteristics of the Gaussian shape in the composite shape of the Gaussian shape and the ring shape having a large beam diameter with an intensity low near the periphery and high only at the center portion, as shown in FIG. 3B. Information of the operation is transmitted to the NC device 60A.

When the NC device 60A receives the instruction from the operation unit 50 that the two-stage intensity type is used as the beam profile of the laser beam to be emitted, the NC device 60A controls the first driving unit 42 so that the movable lens 213 in the coupler 20 is moved by the first moving mechanism 41 closer to the D2 direction than when the Gaussian shape is used. When the movable lens 213 is moved in the D2 direction, a part of the laser beam to be made incident passes through the movable lens 213. This makes the spreading angle larger than in the case in which the movable lens 213 is closer to the D1 direction. As a result, a laser beam having a large incident beam diameter is made incident on the second collimator lens 31 of the processing head 30 via the process fiber 12. The incident laser beam is made incident on the first lens region 321 and the second lens region 322 of the second focusing lens 32.

Here, the NC device 60A controls the second driving unit 44 so that the length between the second focusing lens 32 and the top surface of the sheet metal W is between the first focal length FL1 and the second focal length FL2 and the top surface of the sheet metal W is arranged at a position close to the focusing position of the first focal length FL1. By controlling in this manner, a laser beam portion made incident on the first lens region 321 is emitted to the sheet metal W in a state in which the intensity of the center portion is high, and in its periphery, a laser beam portion made incident on the second lens region 322 is emitted in a state in which the intensity is low. In this manner, the sheet metal W is irradiated with a laser beam of the two-stage intensity type, which allows a welding process of a surface treated steel sheet or an aluminum to be suitably executed. It should be noted that in the arrangement of the top surface of the sheet metal W and the second focusing lens 32, if the top surface of the sheet metal W is arranged at a position close to the focusing position of the first focal length FL1, the characteristics of the Gaussian shape become stronger. Conversely, if the top surface of the sheet metal W is arranged at a position close to the focusing position of the second focal length FL2, a composite profile having the characteristics of a ring shape is formed to allows a two-stage intensity distribution. Furthermore, the composite profile (intensity of the Gaussian-shaped beam) can be freely selected according to circumstances such as a laser reflectance, a thickness, a material, and the like of the sheet material.

Figure 3C:
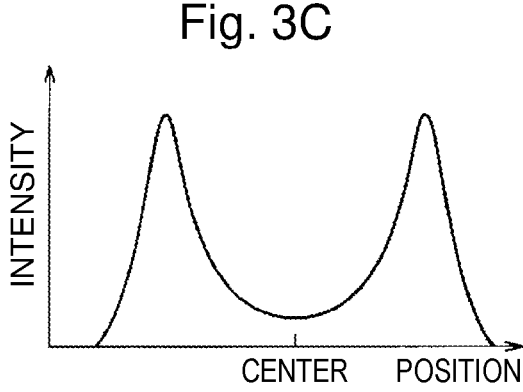
FIG. 3C is a diagram showing an example of an energy intensity at each position of a laser beam emitted by the laser processing machine of the first to fourth embodiments.

Further, when the laser processing machine 100A is used to perform a gap welding, the operator performs an operation in the operation unit 50 to instruct that a sharp ring shape is used as the beam profile of the laser beam to be emitted. The sharp ring shape is a beam profile having a diameter (for example, approximately 2 mm to 4 mm) corresponding to an interval of a gap between the objects to be processed, as shown in FIG. 3C. Information of the operation is transmitted to the NC device 60A. It should be noted that the diameter corresponding to the interval of the gap between the objects to be processed can be changed within an appropriate range by using doff=1 mm shown in FIG. 2 and by controlling the length between the second focusing lens 32 and the top surface of the sheet metal W.

When the NC device 60A receives the instruction from the operation unit 50 that the ring shape having a predetermined diameter is used as the beam profile of the laser beam to be emitted, the NC device 60A controls the first driving unit 42 so that the movable lens 213 in the coupler 20 is moved by the first moving mechanism 41 further closer to the D2 direction than in the case of the two-stage intensity type is used (for example, to the end portion in the D2 direction). When the movable lens 213 is moved in the D2 direction, a ring-shaped laser beam having a large incident beam diameter is made incident on the second collimator lens 31 of the processing head 30 via the coupler 20. Since the ring-shaped laser beam has a large incident beam diameter, for example, about dEN in FIG. 2, the laser beam is made incident on the second lens region 322 of the second focusing lens 32.

Figure 3D:
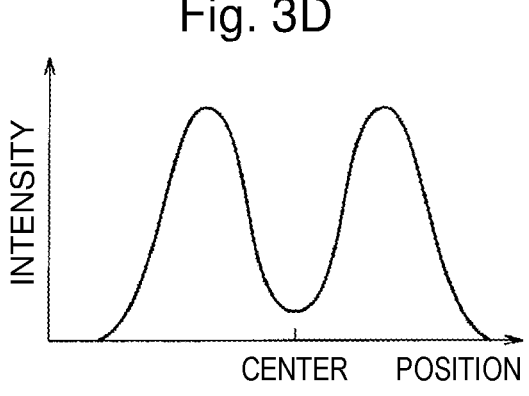
FIG. 3D is a diagram showing an example of an energy intensity at each position of a laser beam emitted by the laser processing machine of the first to fourth embodiments.

Here, since the second lens region 322 has the second focal length FL2, the focal point is not matched in a state in which the length between the second focusing lens 32 and the top surface of the sheet metal W remains separated by the first focal length FL1. As a result, the sheet metal W is irradiated with a ring-shaped laser beam having a small ring diameter and a gentle peak portion as shown in FIG. 3D. Therefore, the NC device 60A controls the second driving unit 44 so that the length between the second focusing lens 32 and the top surface of the sheet metal W is arranged to be separated by the second focal length FL2, and causes the aspherical lens of the second focusing lens 32 to concentrate the light intensity on the peak portion of the ring-shaped beam profile. By controlling in this manner, the sheet metal W is irradiated with a laser beam with a steep ring shape having a desired beam diameter (for example, a ring shape having a radius of doff=1 mm in FIG. 2), which allows a gap welding to be suitably executed.

Second Embodiment

Figure 4:
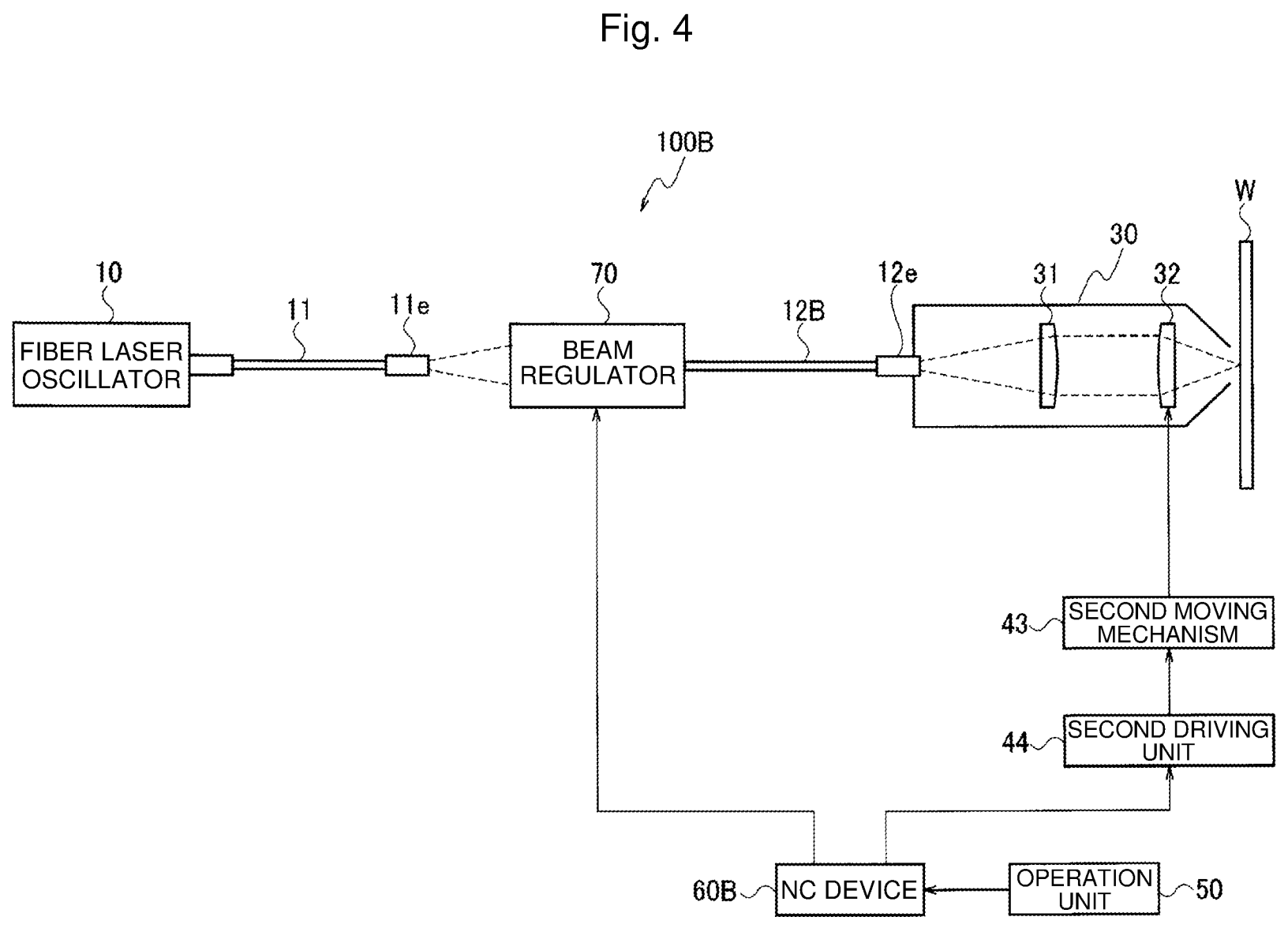

In a laser processing machine 100B of the second embodiment, the coupler 20 in FIG. 1 is replaced with a beam regulator 70 of FIG. 4, and the process fiber 12 is replaced with a process fiber 12B including a core having a double structure. For the beam regulator 70 and the process fiber 12B, the technique described in Patent Literature 2 is utilized, for example.

Figure 5:
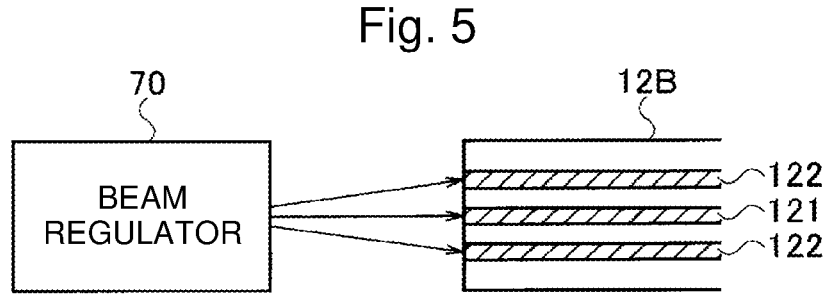
FIG. 5 is a diagram showing a configuration of a process fiber used in the laser processing machine of the second embodiment, and laser beams emitted from an optical device to the process fiber.

In the present embodiment, as shown in FIG. 5, the process fiber 12B includes a core having a double structure of an inner core 121 provided on a center portion and a ring-shaped outer core 122 provided on an outer peripheral side of the inner core 121. Further, the beam regulator 70 causes the laser beam emitted from the fiber laser oscillator 10 to enter at least one of the inner core 121 and the outer core 122.

When the laser processing machine 100B configured in this manner is used to receive an instruction from the operation unit 50 that the Gaussian shape is used as the beam profile of the laser beam to be emitted, the NC device 60B controls the laser beam so as to be made incident on the inner core 121 of the process fiber 12B from the beam regulator 70. The laser beam made incident on the inner core 121 is made incident on the second collimator lens 31 of the processing head 30, and is made incident on the first lens region 321 of the second focusing lens 32.

Then, in the same manner as the first embodiment, the NC device 60B controls the second driving unit 44 so that the length between the second focusing lens 32 and the top surface of the sheet metal W is arranged to be separated by the first focal length FL1. As a result, the Gaussian-shaped laser beam having a small beam diameter is focused on the sheet metal W.

Further, when the laser processing machine 100B according to the present embodiment is used to receive an instruction from the operation unit 50 that the two-stage intensity type is used as the beam profile of the laser beam to be emitted, the NC device 60B controls the laser beam so as to be made incident on the inner core 121 and the outer core 122 of the process fiber 12B from the beam regulator 70. The laser beam made incident on the inner core 121 is made incident on the first lens region 321 of the second focusing lens 32 from the second collimator lens 31 of the processing head 30. Further, the laser beam made incident on the outer core 122 is made incident on the second lens region 322 of the second focusing lens 32 from the second collimator lens 31.

Then, in the same manner as the first embodiment, the NC device 60B controls the length between the second focusing lens 32 and the top surface of the sheet metal W so as to be between the first focal length FL1 and the second focal length FL2, and the top surface of the sheet metal W so as to be arranged at a position close to the focusing position of the first focal length FL1. As a result, the laser beam of the two-stage intensity type is focused on the sheet metal W.

Further, when the laser processing machine 100B according to the present embodiment is used to receive an instruction from the operation unit 50 that the ring shape is used as the beam profile of the laser beam to be emitted, the NC device 60B controls the laser beam so as to be made incident on the outer core 122 of the process fiber 12B from the beam regulator 70. The laser beam made incident on the outer core 122 is made incident on the second lens region 322 of the second focusing lens 32 from the second collimator lens 31.

Then, in the same manner as the first embodiment, the NC device 60B controls the second driving unit 44 so that the length between the second focusing lens 32 and the top surface of the sheet metal W is arranged to be separated by the second focal length FL2. As a result, the laser beam with the sharp ring shape is focused on the sheet metal W.

Third Embodiment

Figure 6:
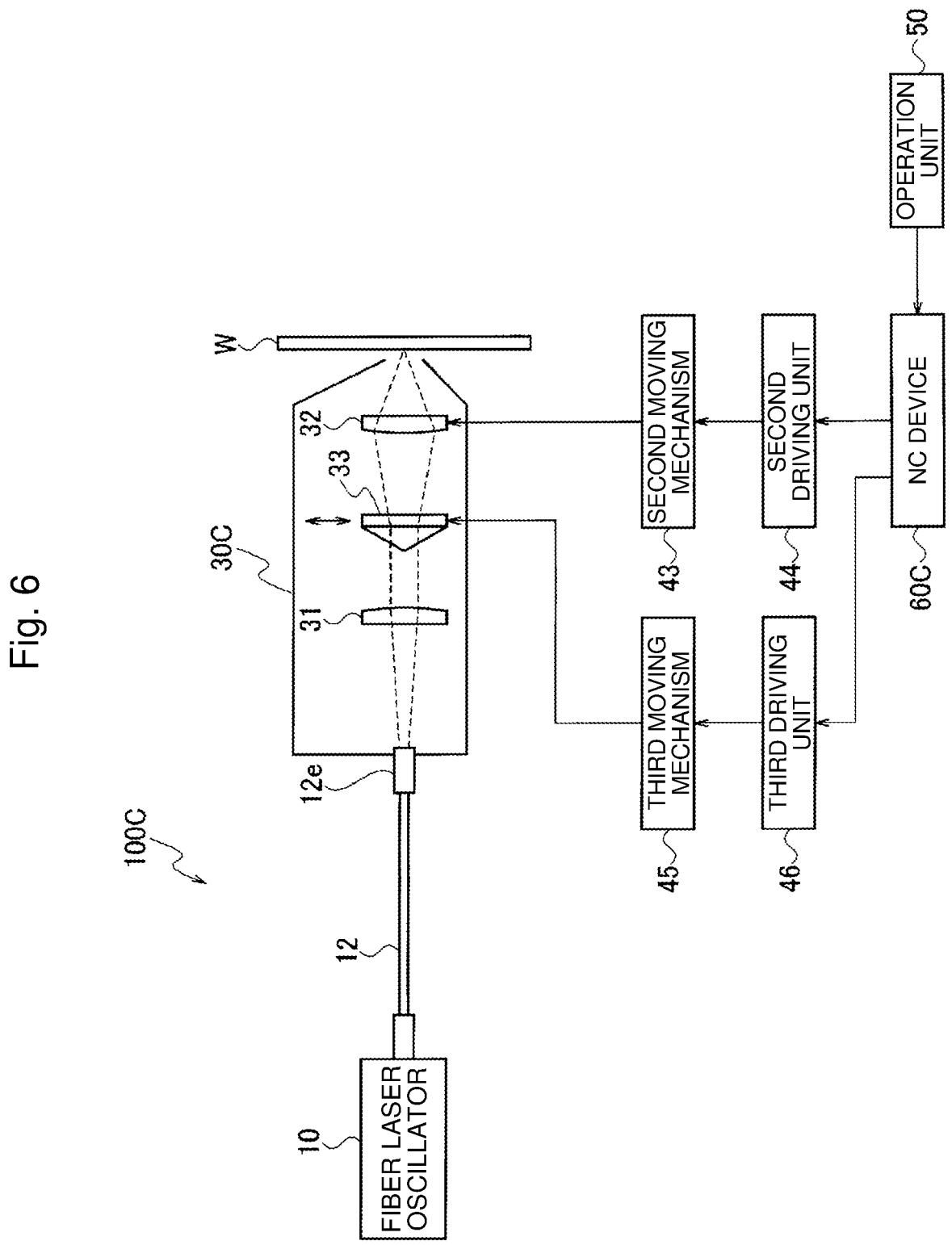
FIG. 6 is an overall view showing a configuration of a laser processing machine of a third embodiment.

As shown in FIG. 6, a laser processing machine 100C of the third embodiment includes the fiber laser oscillator 10 and a processing head 30C configured to focus a laser beam emitted from the fiber laser oscillator 10 on the sheet metal W. The laser beam emitted from the fiber laser oscillator 10 is transmitted to the processing head 30C by the process fiber 12.

The processing head 30C includes a second collimator lens 31, a second focusing lens 32, and an axicon lens 33. The axicon lens 33 is an optical component in a conical shape installed by using a technique, for example, described in Patent Literature 3. The axicon lens 33 is arranged in a state movable between a position on the optical axis, which is between the second collimator lens 31 and the second focusing lens 32, and a position deviated from the position on the optical axis. When the axicon lens 33 is located between the second collimator lens 31 and the second focusing lens 32, the axicon lens 33 is arranged in such a manner that the conical surface thereof faces toward the second collimator lens 31 on the incident side and the plane surface thereof faces toward the second focusing lens 32 on the emitting side. Further, the laser processing machine 100C includes a third moving mechanism 45 for moving the axicon lens 33 to a predetermined position, and a third driving unit 46 for driving the third moving mechanism 45.

When the laser processing machine 100C configured in this manner is used to receive an instruction from the operation unit 50 that the Gaussian shape is used as the beam profile of the laser beam to be emitted, the NC device 60C controls the third driving unit 46 so that the axicon lens 33 is moved by the third moving mechanism 45 to a position deviated from the optical axis between the second collimator lens 31 and the second focusing lens 32. When the axicon lens 33 is moved to the position, the laser beam emitted from the fiber laser oscillator 10 is made incident on the second collimator lens 31 of the processing head 30C while the incident beam diameter remains small, and made incident on the first lens region 321 of the second focusing lens 32.

Then, in the same manner as the first embodiment, the NC device 60C controls the arrangement so that the length between the second focusing lens 32 and the top surface of the sheet metal W is separated by the first focal length FL1. As a result, the Gaussian-shaped laser beam having a small beam diameter is focused on the sheet metal W.

Further, when the laser processing machine 100C according to the present embodiment is used to receive an instruction from the operation unit 50 that the ring shape is used as the beam profile of the laser beam to be emitted, the NC device 60C arranges the axicon lens 33 on the optical axis between the second collimator lens 31 and the second focusing lens 32. When the axicon lens 33 is arranged at the position, the laser beam emitted from the fiber laser oscillator 10 is made incident on the second collimator lens 31 of the processing head 30C, and made incident on the second lens region 322 of the second focusing lens 32 as the spreading angle is changed and the incident beam diameter is increased.

Then, in the same manner as the first embodiment, the NC device 60C controls the arrangement so that the length between the second focusing lens 32 and the top surface of the sheet metal W is separated by the second focal length FL2. As the result, the laser beam with the sharp ring shape is focused on the sheet metal W.

Fourth Embodiment

Figure 7:
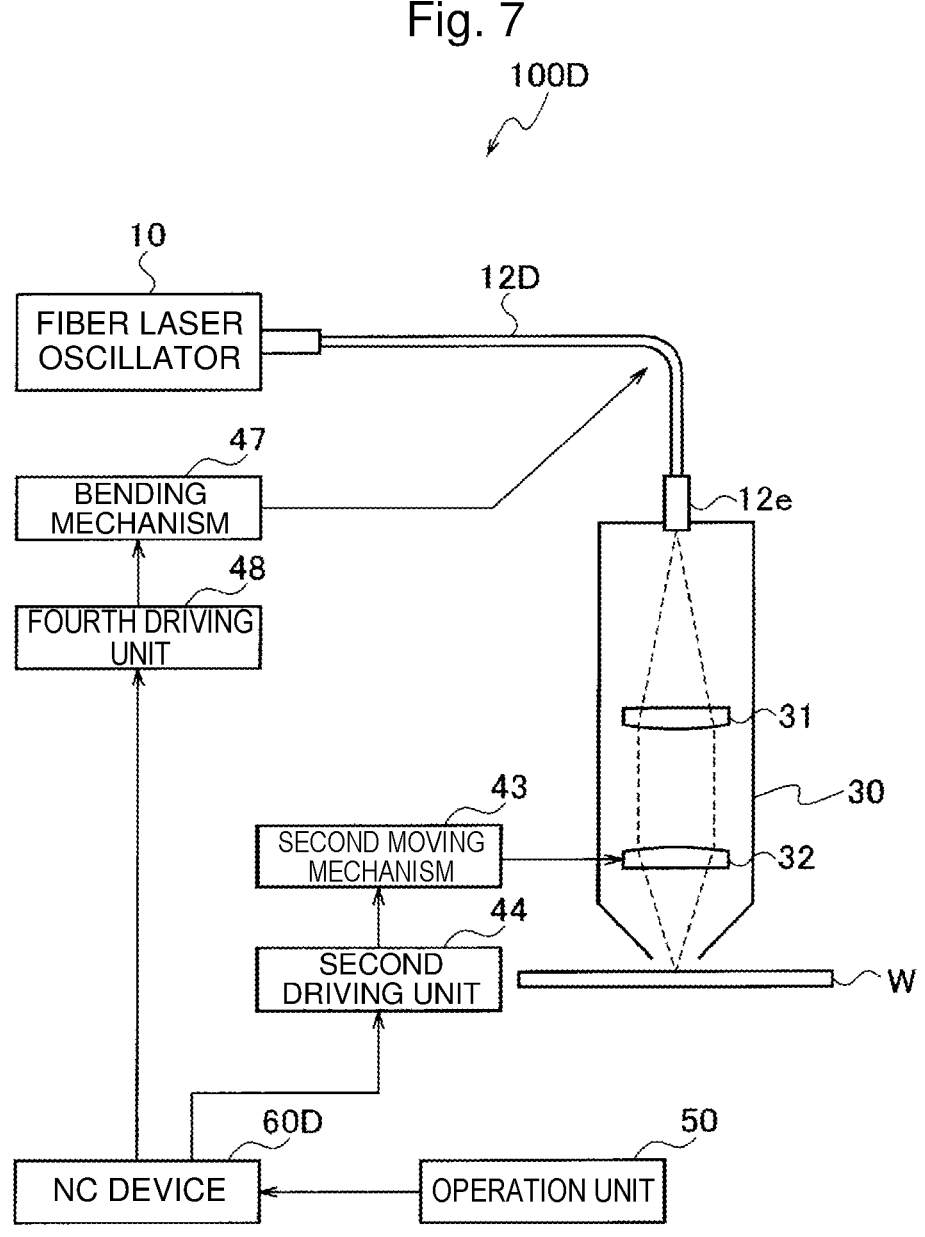
FIG. 7 is an overall view showing a configuration of a laser processing machine of a fourth embodiment.

As shown in FIG. 7, a laser processing machine 100D of the fourth embodiment includes the fiber laser oscillator 10 and the processing head 30 configured to focus a laser beam emitted from the fiber laser oscillator 10 on the sheet metal W. The laser beam emitted from the fiber laser oscillator 10 is transmitted to the processing head 30 by a process fiber 12D capable of being bent at a predetermined angle as described, for example, in Patent Literature 4. Further, the laser processing machine 100D includes a bending mechanism 47 for bending the process fiber 12D at the predetermined angle, and a fourth driving unit 48 configured to drive the bending mechanism 47.

When the laser processing machine 100D configured as described above is used to receive an instruction from the operation unit 50 that the Gaussian shape is used as the beam profile of the laser beam to be emitted, the NC device 60D controls the fourth driving unit 48 so that the process fiber 12D is turned to straight state by the bending mechanism 47. When the process fiber 12D is turned to a straight state, the laser beam emitted from the fiber laser oscillator 10 is made incident on the second collimator lens 31 of the processing head 30 while the incident beam diameter remains small, and made incident on the first lens region 321 of the second focusing lens 32.

Then, in the same manner as the first embodiment, the NC device 60D controls the arrangement so that the length between the second focusing lens 32 and the top surface of the sheet metal W is separated by the first focal length FL1. As a result, the Gaussian-shaped laser beam having a small beam diameter is focused on the sheet metal W.

Further, when the laser processing machine 100D according to the present embodiment is used to receive an instruction from the operation unit 50 that the two-stage intensity type is used as the beam profile of the laser beam to be emitted, the NC device 60D controls the fourth driving unit 48 so that the process fiber 12D is bent by a predetermined angle by the bending mechanism 47. When the process fiber 12D is bent by the predetermined angle, the incident beam diameter of the laser beam emitted from the fiber laser oscillator 10 is increased as compared with that of the process fiber 12D in the straight state. As a result, the laser beam is made incident on the second collimator lens 31 of the processing head 30, and made incident on the first lens region 321 and the second lens region 322 of the second focusing lens 32.

Then, in the same manner as the first embodiment, the NC device 60D controls the length between the second focusing lens 32 and the top surface of the sheet metal W so as to be between the first focal length FL1 and the second focal length FL2, and the top surface of the sheet metal W so as to be arranged at a position close to the focusing position of the first focal length FL1. As a result, the laser beam of the two-stage intensity type is focused on the sheet metal W.

Further, when the laser processing machine 100D according to the present embodiment is used to receive an instruction from the operation unit 50 that the ring shape is used as the beam profile of the laser beam to be emitted, the NC device 60D also controls the fourth driving unit 48 so that the process fiber 12D is bent by a predetermined angle by the bending mechanism 47. Then, the laser beam emitted from the fiber laser oscillator 10 is made incident on the second collimator lens 31 of the processing head 30, and made incident on the second lens region 322 of the second focusing lens 32.

Then, in the same manner as the first embodiment, the NC device 60D controls the second focusing lens 32 so as to be arranged at a position separated from the sheet metal W by the second focal length FL2. As a result, the laser beam with the sharp ring shape is focused on the sheet metal W.

According to the first to fourth embodiments, the beam profile of the laser beam can be changed to be focused on the sheet metal W according to the processing condition. When a gap welding is performed, this makes it possible to irradiate the sheet metal W with the laser beam with the sharp ring shape having a beam diameter of a size corresponding to the interval of the gap between the objects to be processed. As a result, suitable processing can be performed.

Further, in the first to fourth embodiments described above, a camera device for photographing a portion to be processed of the sheet metal W may be installed in each of the laser processing machines 100A to 100D so that before performing a gap welding, the NC devices 60A to 60D each analyzes imaging information photographed by the camera device, measures an interval of a gap between the objects to be processed, and then emits a ring-shaped laser beam having a beam diameter corresponding to the measured value.

The present invention is not limited to the present embodiments described above, and various modifications can be made without departing from the gist of the present invention.

The disclosure of the present application is related to the subject matter described in Japanese Patent Application No. 2019-106118, filed on Jun. 6, 2019, and all these disclosures are incorporated herein by reference.

The invention claimed is:

1. A laser processing machine comprising:
a coupler capable of changing a spreading angle and a beam diameter of a laser beam emitted from a fiber laser oscillator;
a collimator lens configured to receive the laser beam emitted from the coupler and convert the laser beam into a collimated beam;
a focusing lens configured to focus the collimated laser beam emitted from the collimator lens, the focusing lens including a first lens region with a first focal length on an inner peripheral side of the focusing lens and a second lens region with a second focal length on an outer peripheral side of the focusing lens, the second focal length being longer than the first focal length; and
a moving mechanism configured to move the focusing lens in an optical axis direction,
wherein a focusing position of the first lens region of the focusing lens is on an optical axis of the laser beam, and a focusing position of the second lens region is at a ring-shaped position around the optical axis, and
wherein, by changing the spreading angle and the beam diameter of the laser beam by the coupler, the laser beam is selectively made incident on only the first lens region, only the second lens region, or both the first lens region and the second lens region of the focusing lens, thereby changing a beam profile of the laser beam irradiated on an object to be processed.

2. The laser processing machine according to claim 1, wherein a focusing position of the first lens region of the focusing lens is on an optical axis of the laser beam, and a focusing position of the second lens region is at a position deviated from the optical axis.

3. The laser processing machine according to claim 1, wherein the coupler changes a beam parameter product of the laser beam emitted from the fiber laser oscillator to change the spreading angle and the beam diameter.

4. A laser processing method carried out by the laser processing machine according to claim 1, the laser processing method comprising
moving, by the moving mechanism, the focusing lens in the optical axis direction so that a length between the focusing lens and an object to be processed is between the first focal length and the second focal length when the laser beam is made incident on the first lens region and the second lens region of the focusing lens by the coupler.

5. A laser processing method carried out by the laser processing machine according to claim 1, the laser processing method comprising
moving, by the moving mechanism, the focusing lens in the optical axis direction so that a length between the focusing lens and an object to be processed is the second focal length when a ring-shaped laser beam is made incident on the second lens region of the focusing lens by the coupler.

* * * * *